United States Patent
Kim et al.

(10) Patent No.: US 6,239,968 B1
(45) Date of Patent: May 29, 2001

(54) DETACHABLE CASE FOR AN ELECTRONIC ORGANIZER

(75) Inventors: Daniel Sung-hwe Kim; Edwin Thorne, III; Dennis Joseph Boyle, all of Palo Alto; Markus Diebel, San Francisco, all of CA (US); Elisha Tal, Macabin (IL)

(73) Assignee: Ideo Product Development Inc., Palo Alto, CA (US)

( * ) Notice: Subject to any disclaimer, the term of this patent is extended or adjusted under 35 U.S.C. 154(b) by 0 days.

(21) Appl. No.: 09/451,679

(22) Filed: Nov. 30, 1999

Related U.S. Application Data

(60) Provisional application No. 60/113,181, filed on Dec. 21, 1998.

(51) Int. Cl.[7] .......................................................... H05K 5/00
(52) U.S. Cl. ............................ 361/679; 361/683; 361/686; 361/727; 361/755; 206/320; 206/576; 220/334; 220/337
(58) Field of Search ...................................... 361/679–683; 345/168, 169, 905; 400/691–693; 220/581, 836, 843, 845, 848, 811, 813, 815, 4.22, 4.23; 206/38, 214, 232, 472, 471, 320, 576; 16/319, 284, 292, 317, 297, 223, 235

(56) References Cited

U.S. PATENT DOCUMENTS

| | | | |
|---|---|---|---|
| D. 307,134 | 4/1990 | Makidera | D14/100 |
| D. 318,858 | 8/1991 | Daly et al. | D14/100 |
| D. 321,175 | 10/1991 | Tsuchiya | D14/100 |
| D. 321,865 | 11/1991 | Derocher | D14/100 |
| D. 326,446 | 5/1992 | Wong | D14/100 |
| D. 334,736 | 4/1993 | Sawada et al. | D14/100 |
| D. 345,147 | 3/1994 | Fukutake et al. | D14/100 |
| D. 346,366 | 4/1994 | Kim et al. | D14/100 |
| D. 346,591 | 5/1994 | Lee | D14/100 |
| D. 352,279 | 11/1994 | Foy et al. | D14/100 |
| D. 360,195 | 7/1995 | Kimbrough et al. | D14/100 |
| D. 362,865 | 10/1995 | Komuta et al. | D18/2 |
| D. 366,280 | 1/1996 | Henderson | D19/52 |
| D. 370,207 | 5/1996 | Grewe et al. | D14/100 |
| D. 372,932 | 8/1996 | Tamura et al. | D18/2 |
| D. 373,118 | 8/1996 | Naruki | D14/100 |
| D. 385,299 | 10/1997 | Adams | D19/26 |
| D. 386,521 | 11/1997 | Eisenbaum | D19/26 |
| D. 389,463 | 1/1998 | Kasahara | D14/100 |
| D. 391,987 | 3/1998 | Jambhekar et al. | D19/26 |
| D. 392,947 | 3/1998 | Lino | D14/100 |
| D. 395,039 | 6/1998 | Murphy et al. | D14/100 |
| 4,340,375 | 7/1982 | Sakaue et al. | 434/201 |
| 4,693,392 * | 9/1987 | Contreras, Sr. | 220/867 |
| 4,768,648 * | 9/1988 | Glass | 206/38 |
| 4,918,632 * | 4/1990 | York | 361/680 |
| 4,927,986 | 5/1990 | Daly | 178/18 |

(List continued on next page.)

Primary Examiner—Leo P. Picard
Assistant Examiner—Boris L. Chervinsky
(74) Attorney, Agent, or Firm—Carr & Ferrell, LLP

(57) ABSTRACT

The present invention provides a personal information system unit detachable case. This case has a top cover assembly, a bottom cover assembly, both of which are pivotable around a longitudinal axis forming a hinge assembly. The top and bottom cover assemblies are similar in shape and function to allow a personal information management electronic system unit to be mounted within the case either facing to the right or to the left at the user's preference. Mounted on the hinge assembly is a mounting rail, which is pivotally mounted on the hinge assembly of the detachable case. This mounting rail extends most of the internal vertical dimension of the case. The mounting rail provides a means for removably attaching a personal management unit within the detachable case. Indents and other openings are provided in the top and/or bottom cover assemblies to accommodate a specific personal system unit or other type of electronic instrument whether it faces toward the top assembly or bottom assembly.

12 Claims, 11 Drawing Sheets

U.S. PATENT DOCUMENTS

| | | | |
|---|---|---|---|
| 5,022,529 | * | 6/1991 | Kang .................................... 206/581 |
| 5,109,354 | * | 4/1992 | Yamashita et al. .................. 361/681 |
| 5,179,502 | * | 1/1993 | Matsuda ............................... 361/680 |
| 5,180,891 | | 1/1993 | Trumbo ................................. 178/18 |
| 5,401,917 | | 3/1995 | Yoshida et al. ....................... 178/18 |
| 5,422,442 | | 6/1995 | Gouda et al. ......................... 178/18 |
| 5,434,373 | | 7/1995 | Komaki ................................. 178/87 |
| 5,483,262 | | 1/1996 | Izutani ................................. 345/179 |
| 5,530,208 | | 6/1996 | Moriconi et al. ..................... 178/18 |
| 5,555,157 | * | 9/1996 | Moller et al. ......................... 361/683 |
| 5,635,959 | | 6/1997 | Takeuchi et al. ..................... 345/179 |
| 5,644,516 | * | 7/1997 | Podwalny et al. ................... 364/708.1 |
| 5,703,626 | | 12/1997 | Itoh et al. ............................. 345/173 |
| 5,712,760 | * | 1/1998 | Coulon et al. ........................ 361/680 |
| 5,725,098 | * | 3/1998 | Seifert et al. ......................... 206/472 |
| 5,754,169 | | 5/1998 | Yashiro ................................. 345/173 |
| 5,756,941 | | 5/1998 | Snell ..................................... 178/18 |
| 5,859,762 | * | 1/1999 | Clark et al. ........................... 361/686 |

\* cited by examiner

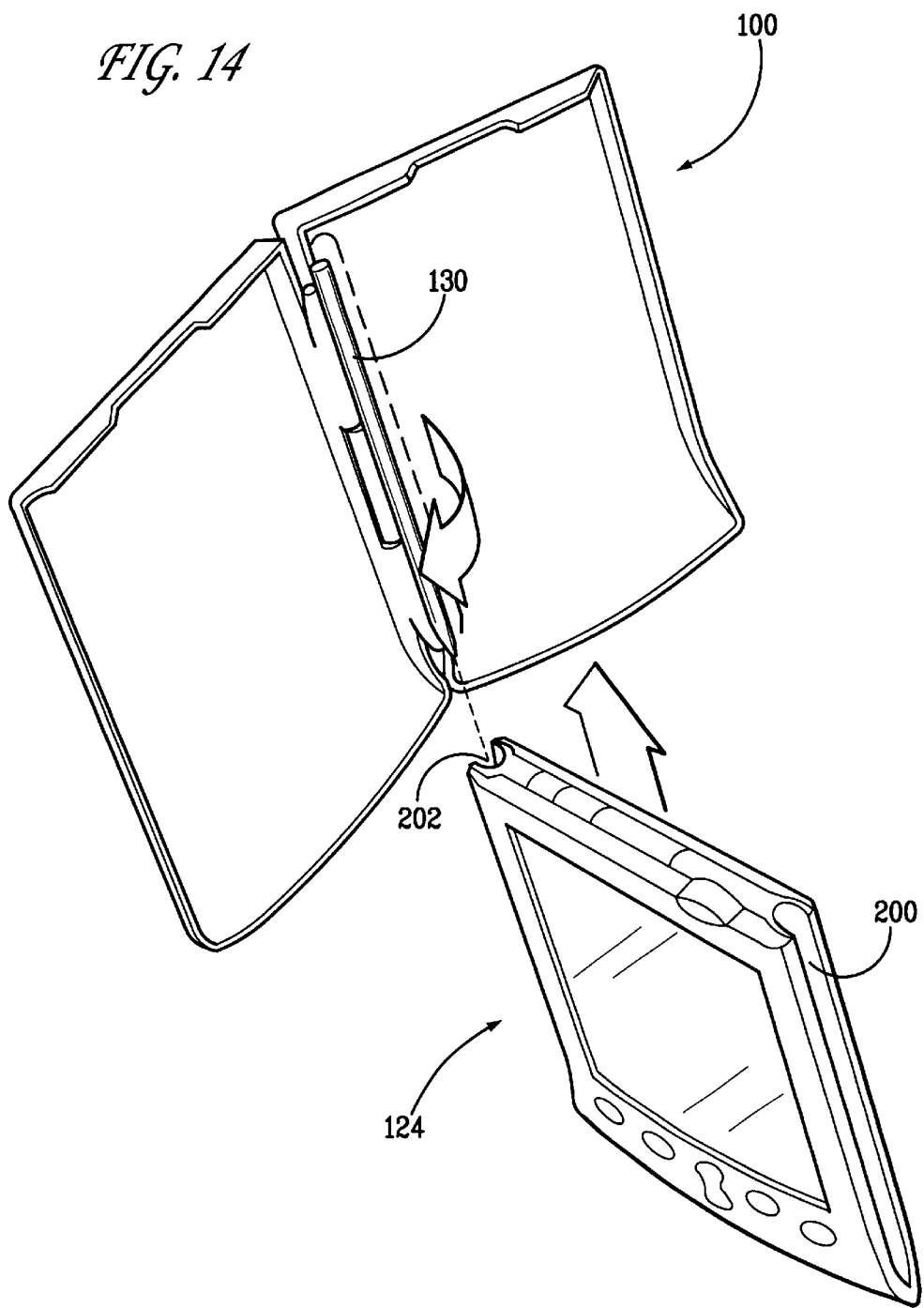

DETACHABLE CASE FOR AN ELECTRONIC ORGANIZER

CROSS-REFERENCES TO RELATED APPLICATIONS

This application claims the benefit of commonly assigned U.S. Design patent application Ser. No. 29/093,963, entitled "Detachable Case", filed on Sep. 21, 1998; and commonly assigned Provisional Application, entitled "Detachable Case For An Electronic Organizer", filed on Dec. 21, 1998 as Ser. No. 60/113,181, both of which are incorporated herein by reference.

BACKGROUND OF THE INVENTION

1. Field of the Invention

This invention relates generally to external protective covers for instruments appropriate for use with a touch-sensitive electronic screen ("touch-screen") and more particularly to a hard case assembly, which may be used with devices commonly known as personal digital assistants (PDA) or personal information managers (PIM).

2. Description of Related Art

Many electronic information devices, such as palmtop organizers and computers, utilize touch-screens for input of information and commands. Entering information via the touch-screen is typically accomplished either by applying pressure to specific locations on the touch-screen, or by "writing" (i.e., forming characters, words, or symbols) on the touch-screen. Commonly, a specially designed stylus is employed to enter information in either of the foregoing manners.

These palmtop devices typically are designed for use in a user's hand and are of a small enough configuration to be carried on one's person in a pocket, or for easy mobility in a purse or briefcase. These personal information management systems utilize the touch screens for information input, as well as displaying the input or output information thereon. Further, these personal organizers may also have pushbutton or touch button interfaces for user input, such as for on/off control, scroll up—scroll down control, change function control, and so on. As these personal devices are designed for easy portability, it is desirable to provide an external case to house the unit, while allowing protection from dirt and grime, but more importantly for protecting the touch screen from being scratched. Further, an external case can also protect from accidental depression of one or more of the control buttons which could inadvertently turn the unit on, thereby draining the battery, or inadvertently initiating an unwanted function, such as erasing an important message stored in the unit.

Prior art coverings have been provided, such as custom leather covers, which allow for protection of the case and from accidental keying of a function. However, leather cases, being soft themselves, cannot always provide the desired protection. For instance, if the touch screen is to be protected, then the leather case must be a wrap around type, which is generally unacceptable when the leather case must be opened for use of the device itself.

In addition, while many users of these personal management systems are right handed, many are left-handed. Because right-handed people comprise the majority of the population, most manufacturers design their products with only right-handed users in mind. Left-handed people are left to adapt to a right handed operating unit, whatever it is. No prior art solution teaches the alternate use or construction of a personal information system for a right-handed person, or, alternatively, a left-handed person.

Other prior art references show a construction of a hand-held computing device. U.S. Pat. No. Des. 346,366 to Kim et al, issued Apr. 26, 1994 discloses a combined pen and database computer. This design patent shows a top and bottom section pivotable about an end axis. U.S. Pat. No. Des. 360,195 to Kimbrough et al, issued Jul. 11, 1995 discloses a handheld computing device. This design patent shows a top section that is pivotable about two longitudinal axes to wrap around the device in an operating mode. U.S. Pat. No. Des. 362,865 to Komuta et al, issued Oct. 3, 1995 discloses an electronic calculator. This design patent shows a top section and a bottom section pivotable about a longitudinal edge axis. U.S. Pat. No. Des. 366,280 to Henderson, issued Jan. 16, 1996 discloses a luminous drawing surface and night light. This design patent shows a top and bottom surface pivotable about hinges on one longitudinal edge thereof.

SUMMARY OF THE INVENTION

The present invention comprises a personal information system unit detachable case. This case has a top cover assembly, a bottom cover assembly, both of which are pivotable around a longitudinal axis forming a hinge assembly. The top and bottom cover assemblies are similar in shape and function to allow a personal information management electronic system unit to be mounted within the detachable case either facing to the right or to the left as a user faces the case. A mounting rail is pivotally mounted on the hinge assembly. This mounting rail extends most of the internal vertical dimensions of the case. The mounting rail provides a means for removably attaching a personal management unit within the detachable case.

BRIEF DESCRIPTION OF THE DRAWINGS

For a more complete understanding of the invention, as well as other features thereof, reference may be had to the following detailed description of the invention in conjunction with the drawings wherein:

FIG. 14 is a schematic view of the detachable case in an open position, with the personal electronic device being mounted thereto.

DESCRIPTION OF THE PREFERRED EMBODIMENTS

The present invention relates to a protective device for use with an input device combining touch-screen stylus and conventional writing instrument functions. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
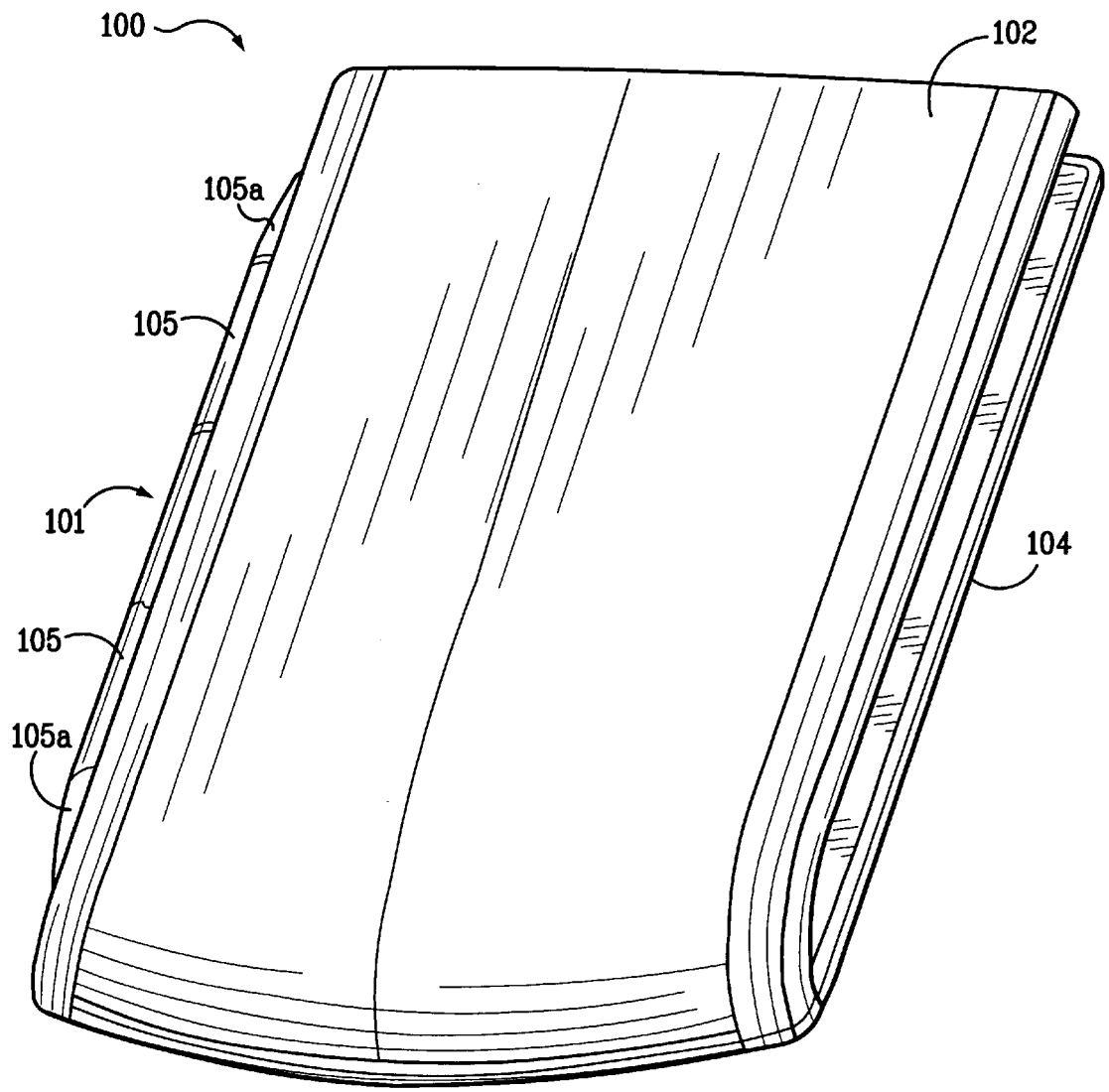
FIG. 1 is a perspective view showing the top, front, right side, and a portion of the left side of a detachable case, according to the present invention.

FIG. 1 is a perspective view showing the top, front, right side, and a portion of the left side of a detachable case 100, according to the present invention. The detachable case 100 is made up of three major sections: top cover assembly 102, bottom cover assembly 104, and hinge assembly 101. The hinge assembly 101 further comprises top cover hinge sections 105a, which extend from the top cover assembly 102. The hinge assembly 101 also comprises bottom cover hinge sections 105, which extends from the bottom cover assembly 104. Section 106, the remaining part of the hinge assembly 101, is part of a mounting rail, which will be seen more clearly in the drawings below. Typically, a user would hold the case 100 and rotate the top cover assembly 102 about the axis of the hinge assembly 101. The bottom hinge section 105 will allow the top cover assembly 102 to rotate about the axis of the hinge assembly 101 at least 180 degrees. This will allow the case 100 to rest completely stabilized on a flat surface, such as a table or pull down tray on an airplane seatback.

Figure 2:
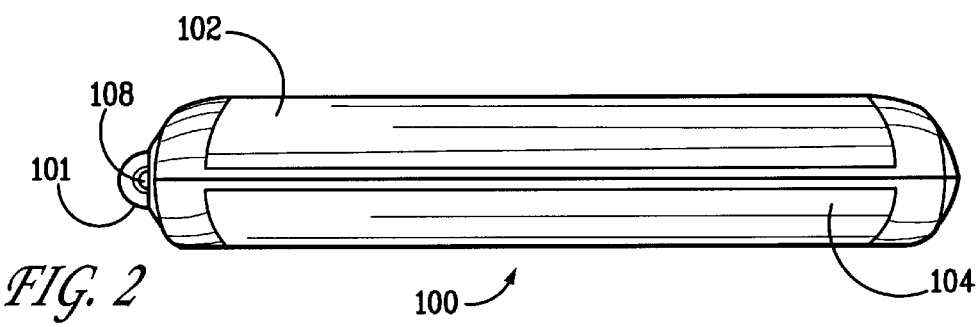
FIG. 2 is a front elevation view of the detachable case.

FIG. 2 is a front view of the detachable case 100 in accordance with the present invention. FIG. 2 shows the top cover assembly 102 in a closed configuration and facing the bottom cover assembly 104. To the left of the top cover assembly 102 is the hinge assembly 101 about which the top cover assembly 102 and bottom cover assembly 104 rotate. Also visible in FIG. 2 is hinge pin 108, which will be discussed in more detail in conjunction with FIG. 13 below.

Figure 3:
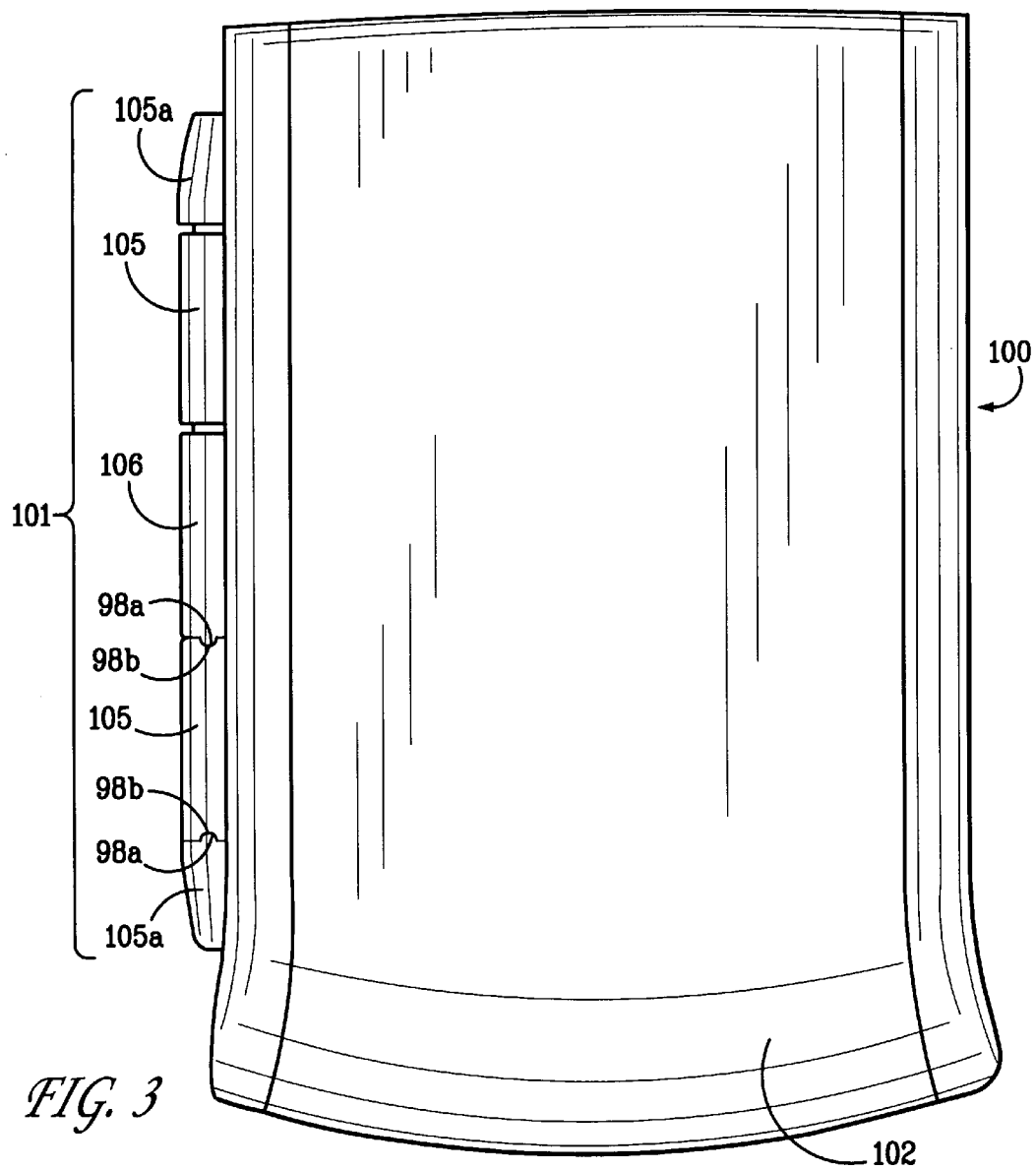
FIG. 3 is a top plan view of the detachable case.

FIG. 3 is a top view of the detachable case 100. This figure shows clearly the top cover assembly 102, as well as the hinge assembly 101 further comprising bottom hinge section 105, top cover hinge section 105a, and section 106. For the purposes of this application, other external embodiments may be utilized and still be in accordance with the principles of the present invention.

Seen also in FIG. 3 are detent bumps 96a and 98a and detent grooves 96b and 98b. These detent bumps 96a and 98a and detent grooves 96b and 98b are used to provide rest positions for a mounting rail 130 (FIG. 8) and top and bottom cover assemblies 102 and 104, as more fully described below in connection with FIG. 8.

Figure 4:
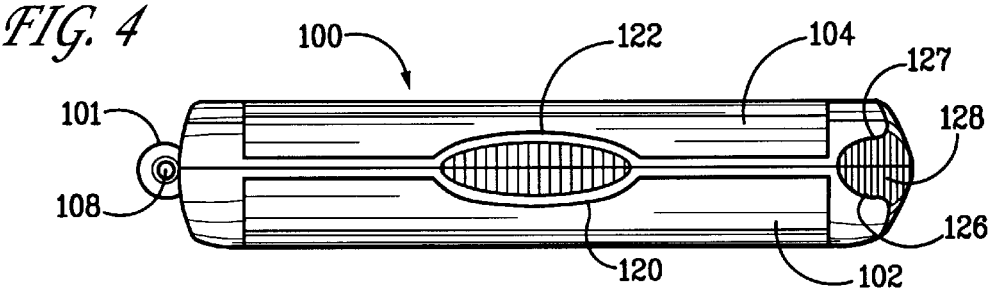
FIG. 4 is a rear elevation view of the detachable case.

FIG. 4 is a rear elevation view of the detachable case 100. Top cover assembly 102 and bottom cover assembly 104 are seen together in the case's closed configuration. Hinge sections 105 and hinge pin 108 are also visible. Seen for the first time in this figure are cutouts 120 and 122. Cutout 122 is a half oval shaped opening in the top cover assembly 102, and cutout 120 is a half oval shaped opening in the bottom cover assembly 104. Together, cutouts 120 and 122 form an oval shaped opening. This oval shaped opening allows a personal information management (PIM) unit, or similar electronic device, removably mounted inside the case 100 to communicate while the case 100 is in a closed configuration. That is, an electronic device 124 (FIG. 14) would be accessible through the oval opening created by the cutouts 120 and 122. Alternatively, the oval shaped opening created by cutouts 120 and 122 could allow access to a printer connection or a modem connection so that the electronic device 124 can print or upload/download from the Internet or other on-line service. In yet another embodiment, the oval shaped opening created by cutouts 120 and 122 may allow access to an infrared apparatus which allows for two way wireless communication with another electronic device, such as a personal computer with a similar infrared or other type wireless communication system.

FIG. 4 also includes openings 126 and 127 molded directly in the top cover assembly 102 and bottom cover assembly 104 covers, respectively. These openings 126 and 127 reveal a stylus unit 128 removably attached to the PIM stored within. While stylus unit 128 is shown attached to the PIM, any other item, which would fit in this description, would be valid here, as well, such as a combination stylus and pen unit.

In FIG. 4, the cutouts 120 and 122 were described as forming an oval shaped opening, but any shaped opening that would accomplish the tasks mentioned above would be appropriate.

Figure 5:
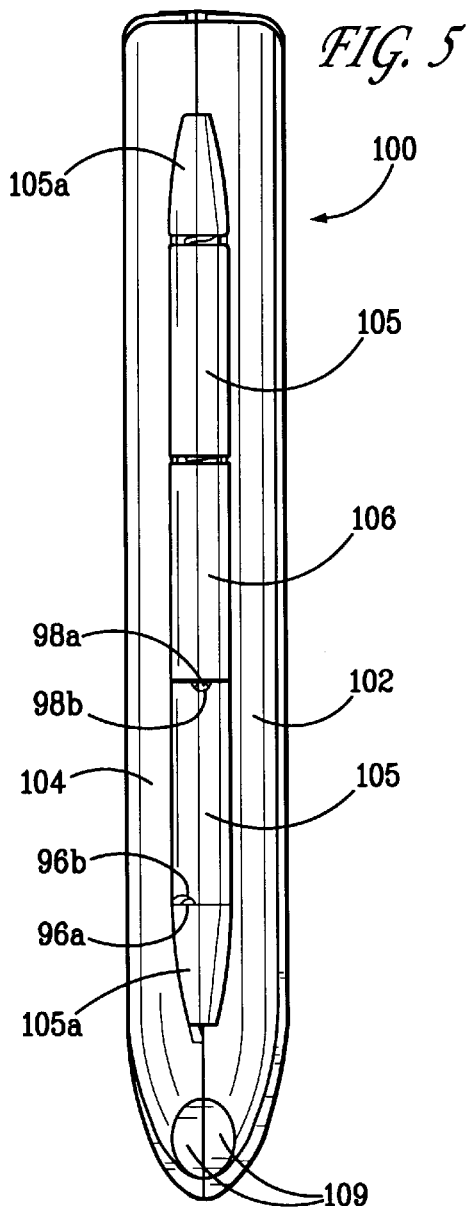
FIG. 5 is a left side elevation view of the detachable case.

FIG. 5 is a left side elevation view of the detachable case 100. This figure similarly shows the case 100 in a closed configuration. Seen are top cover assembly 102, bottom cover assembly 104, hinge sections 105a as part of the upper cover assembly 102, hinge sections 105 as part of the bottom cover assembly 104, and hinge section 106 which is part of the mounting rail. Surface area 109 is a flattened area on both top and bottom cover assemblies 102 and 104, which accommodate opening the case 100 a full 180 degrees. Also seen are detent bumps 96a and 98a and detent grooves 96b and 98b.

Figure 6:
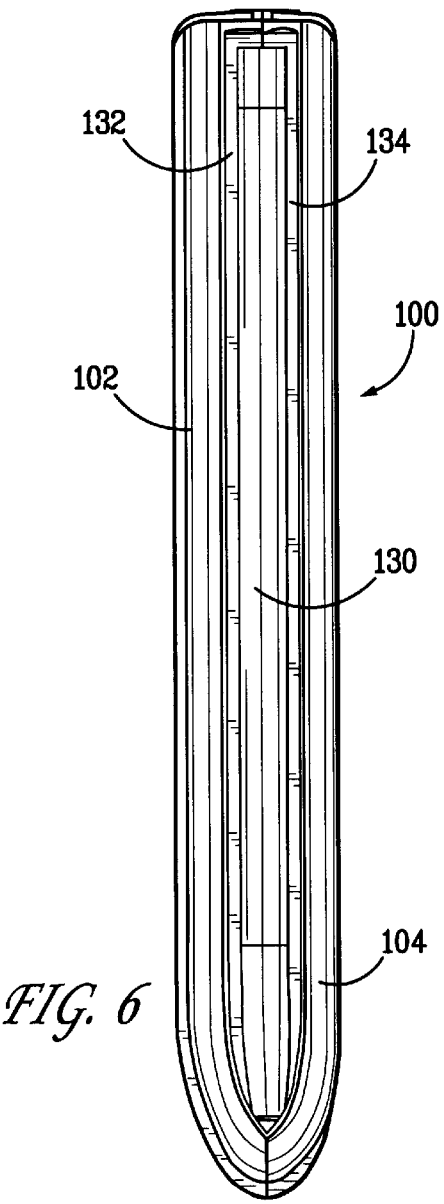
FIG. 6 is a right side elevation view of the detachable case.

FIG. 6 is a right elevation view of the detachable case 100. This figure also depicts the case 100 in a closed position. Seen here are top cover assembly 102 and bottom cover assembly 104. Also molded into the top and bottom covers are molded slots 132 and 134 that are extensions of openings 126 and 127. Through these slots 132 and 134 can be seen a mounting rail 130 which, in this figure is on the far side of the figure, against the hinge assembly 101 (not shown). If a PIM were mounted in the case 100, the PIM would be visible in FIG. 6 and block the view of the mounting rail 130.

Figure 7:
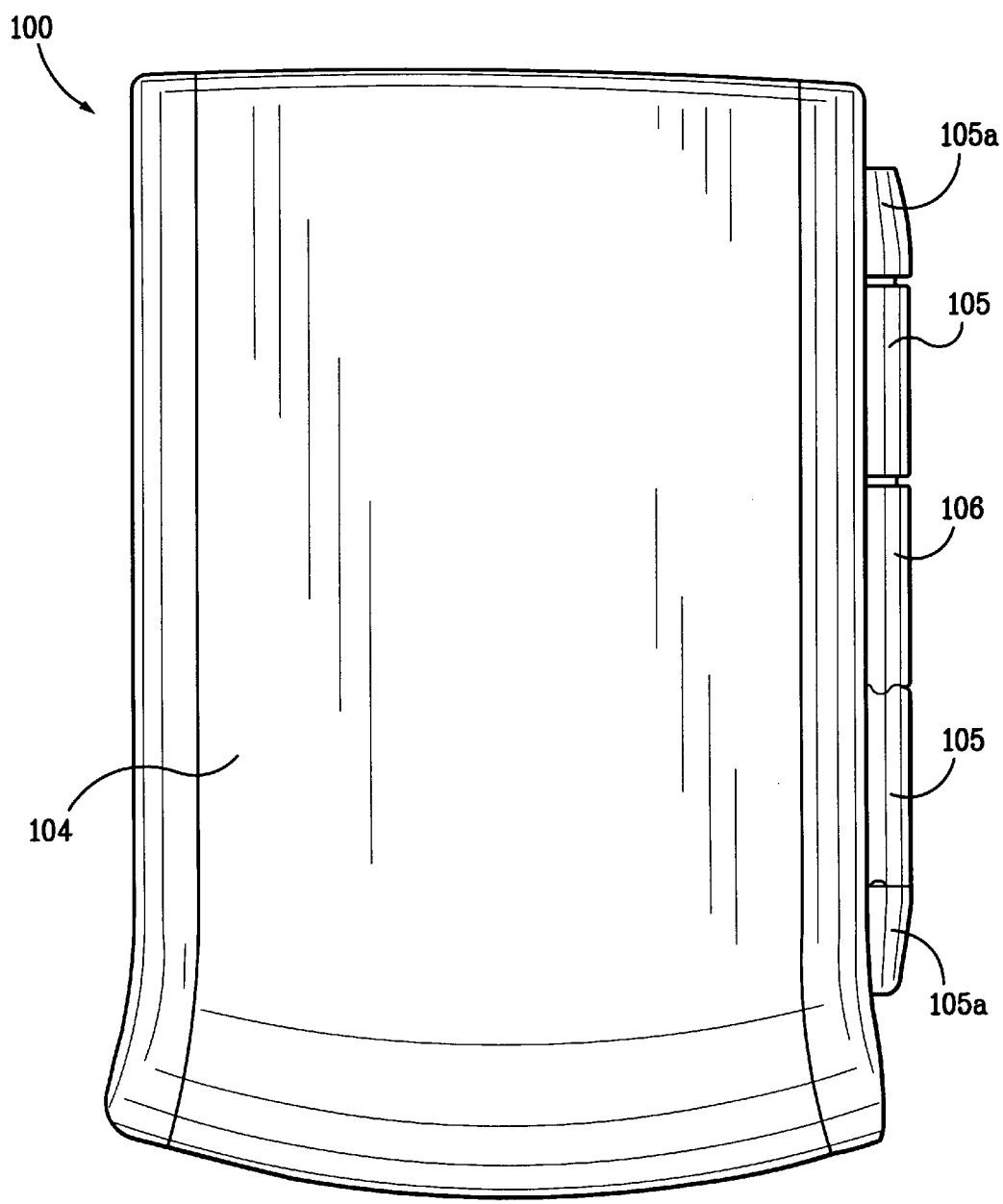
FIG. 7 is a bottom plan view of the detachable case.

FIG. 7 is the bottom view of the detachable case 100. Seen in this figure are bottom cover assembly 104, top cover hinge sections 105a, bottom hinge sections 105, and hinge section 106. While the bottom and top cover assemblies 104 and 102 are seen herein to be very similar, in an alternative embodiment they do not have to be similar.

Figure 8:
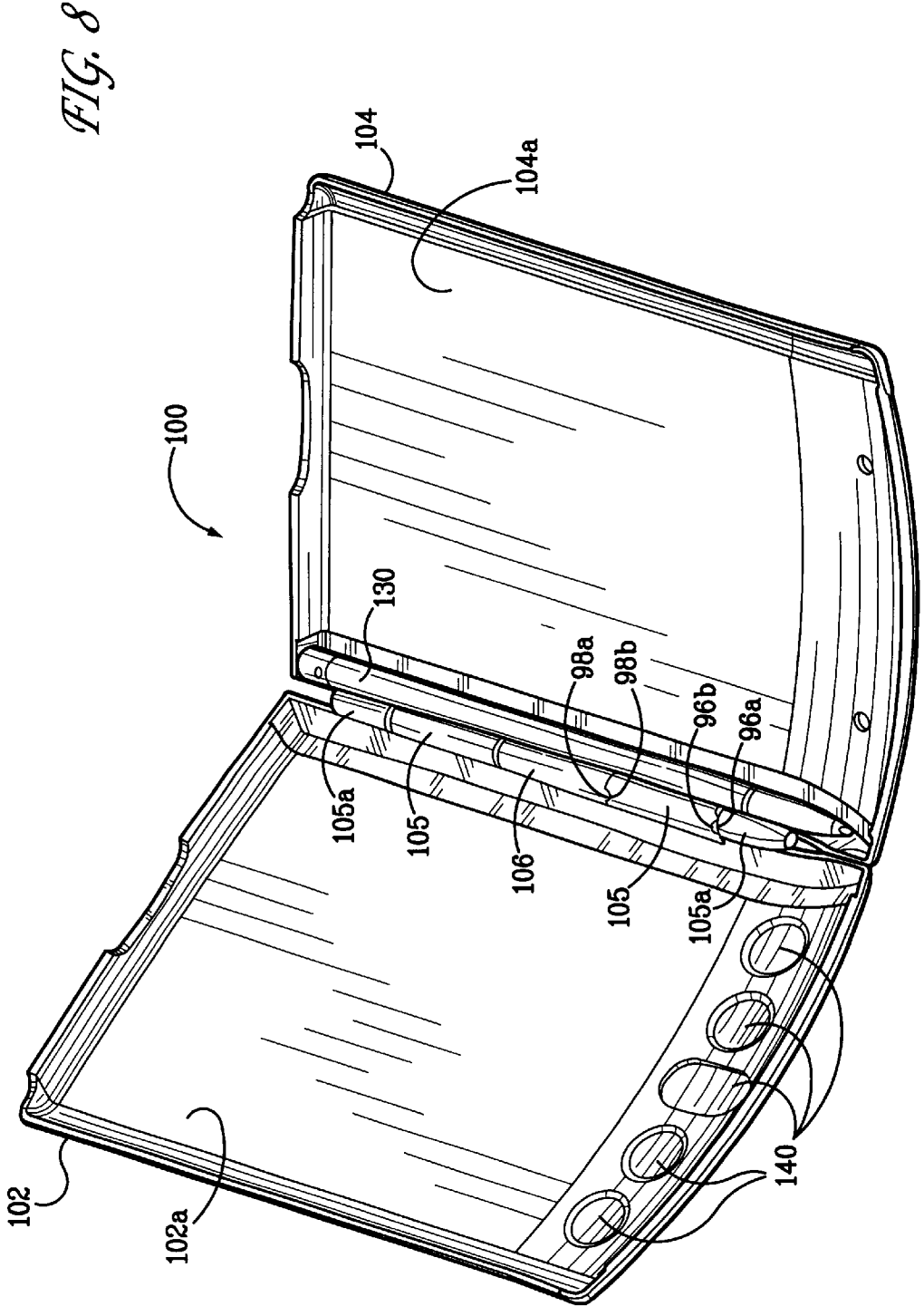
FIG. 8 is a perspective view of the detachable case showing the detachable case opened approximately to three-quarters of a fully opened position, with a mounting rail positioned approximately at 0 degrees from normal or fully closed position.

FIG. 8 is a perspective view of the detachable case 100 only partially open (i.e. approximately open 75% or 120 degrees). All the components of the case 100 are now clearly visible, including the mounting rail 130. Mounting rail 130 is shown lying adjacent to and parallel with a longitudinal axis of the hinge sections 105 and 105a. Also visible is the hinge section 106 that is actually a part of the mounting rail 130. Mounting rail 130 is pivotable about the longitudinal axis of the hinges 105 and 105a between outer limits defined only by the top and bottom cover assemblies 102 and 104. That is, since FIG. 8 is only open about 75% of the total amount it could be open, the mounting rail 130 can only move 75%, as well. As shown in FIG. 8, the mounting rail 130 is currently in a closed position, 0% movement.

FIG. 8 also shows an inner top cover 102a. Inner top cover 102a includes indents 140 formed in or machined out of the inner top cover 102a. Bottom cover assembly 104 also includes an inner bottom cover 104a. If a PIM unit is mounted in the case assembly 100 with its operating surface (the touch screen or viewing screen) facing left in this figure, then inner top cover 102a would be mounted in the top cover assembly 102. The indents formed or manufactured in the inner top cover 102a are to accommodate any buttons or touch points on the PIM unit. These buttons or touch points need to remain unencumbered and out of contact with the top inner cover 102a for fear of accidental operation of buttons located on the PIM when the case 100 is moved into a closed position. With the PIM unit mounted in the case 100 facing to the left in FIG. 8, then inner bottom cover 104a would be mounted in the bottom cover assembly 104.

However, when the PIM unit is mounted in the detachable case 100 facing to the right in FIG. 8, then the user would swap the inner top cover 102a with the inner bottom cover 104a, so that the inner cover with the indent or cutouts would now become the inner bottom cover unit. Similarly, the inner bottom cover 104a would then become the inner top cover unit 102a. This is to accommodate for the buttons or touch points and to ensure that the case covers, when moved into the closed position, do not activate the buttons or touch points.

In a preferred embodiment, inner covers 102a and 104a can be snap mounted into the top and bottom cover assemblies in manners known in the art, such as by small tabs, pressure fit or by some adhesive. The adhesive would make for more of a permanent configuration by the user. Thus, the ability to have the indents 140 on the inner top cover 102a or the inner bottom cover 104a accommodates for a right handed person or left handed person, or any personal choice by a right or left handed person.

Detent bump 98a and detent groove 98b are indicated in FIG. 8, as well, on hinge section 106, which, as described herein, is part of mounting rail 130. There are actually three detent grooves 98b on mounting rail 130. These bump and groove combinations are provided to allow mounting rail 130, and thus the PIM unit mounted on mounting rail 130 to have rest positions at 0 degrees, 90 degrees, and 180 degrees, where the bumps 98a and grooves 98b accommodate for each other.

Detent bump 96a and detent groove 96b are also shown in FIG. 8. Bottom hinge section 105, which extends from bottom cover assembly 104, includes detent bump 96a. Top cover hinge section 105a, which extends from top cover assembly 102, includes detent grooves 96b. The bump 96a and grooves 96b provide rest positions for the top and bottom cover assemblies 102 and 104 at 0 degrees, 120 degrees, and 180 degrees, in a similar manner as does the mounting rail 130 bump 98a and grooves 98b do for the mounting rail 130. There are actually three detent grooves 96b to allow for the three rest positions. Preferably, the bumps 96a and 98a are spring loaded (see FIG. 13) to force indent bumps 96a and 98a into indent grooves 96b and 98b.

While there are three each of grooves 96b and 98b, there could be more or less grooves to allow for more or less rest positions for the covers and mounting rail 130.

Figure 9:
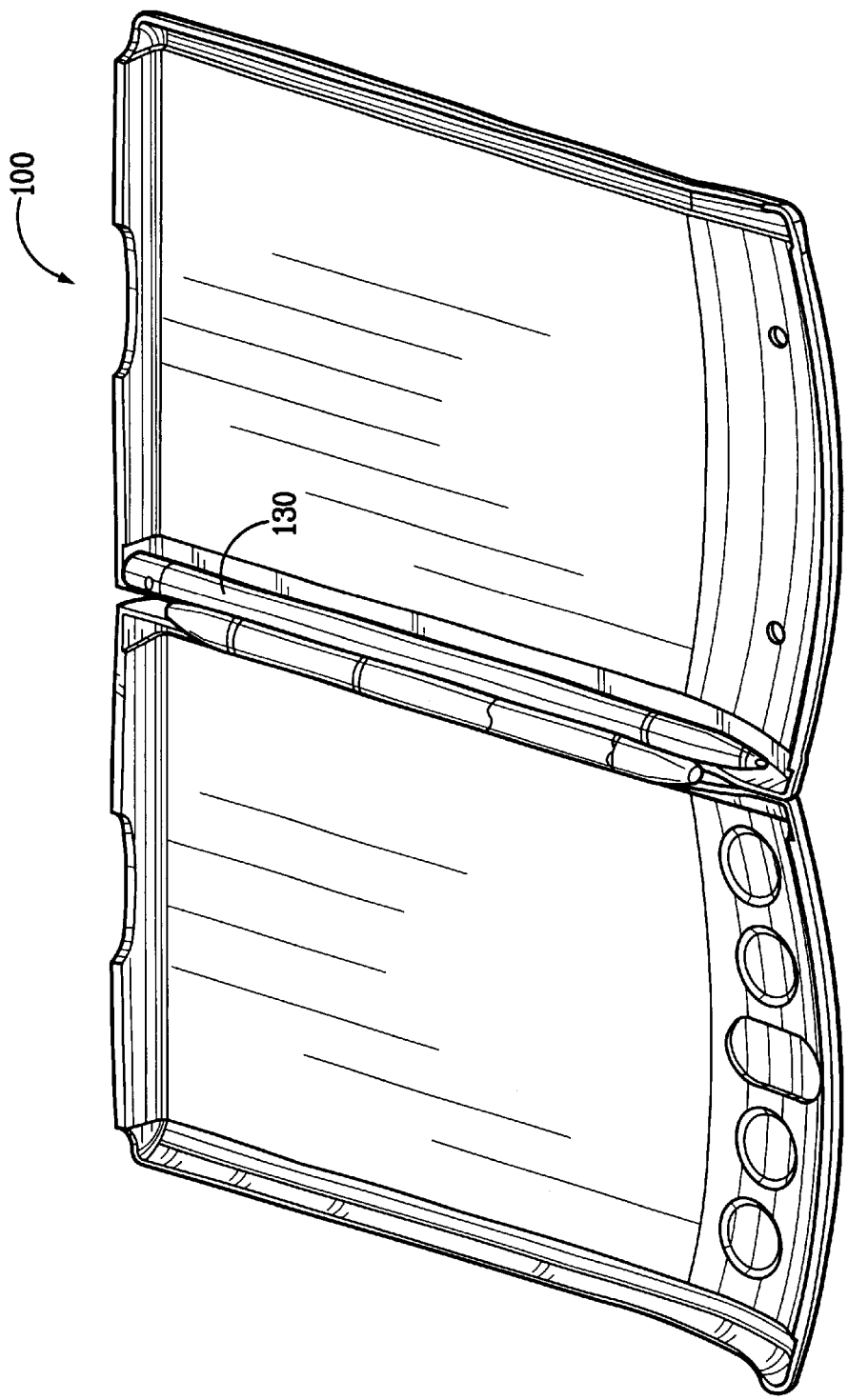
FIG. 9 is a perspective view of the detachable case showing the detachable case in the fully opened position, with a mounting rail positioned approximately at 0 degrees from normal or fully closed position.

FIG. 9 shows the detachable case 100 in its fully open position. The parts of the case 100 are similarly seen as compared with FIG. 8. The mounting rail 130 is seen in its stowed position (i.e. at 0 degrees) against the inner bottom cover 104a.

Figure 10:
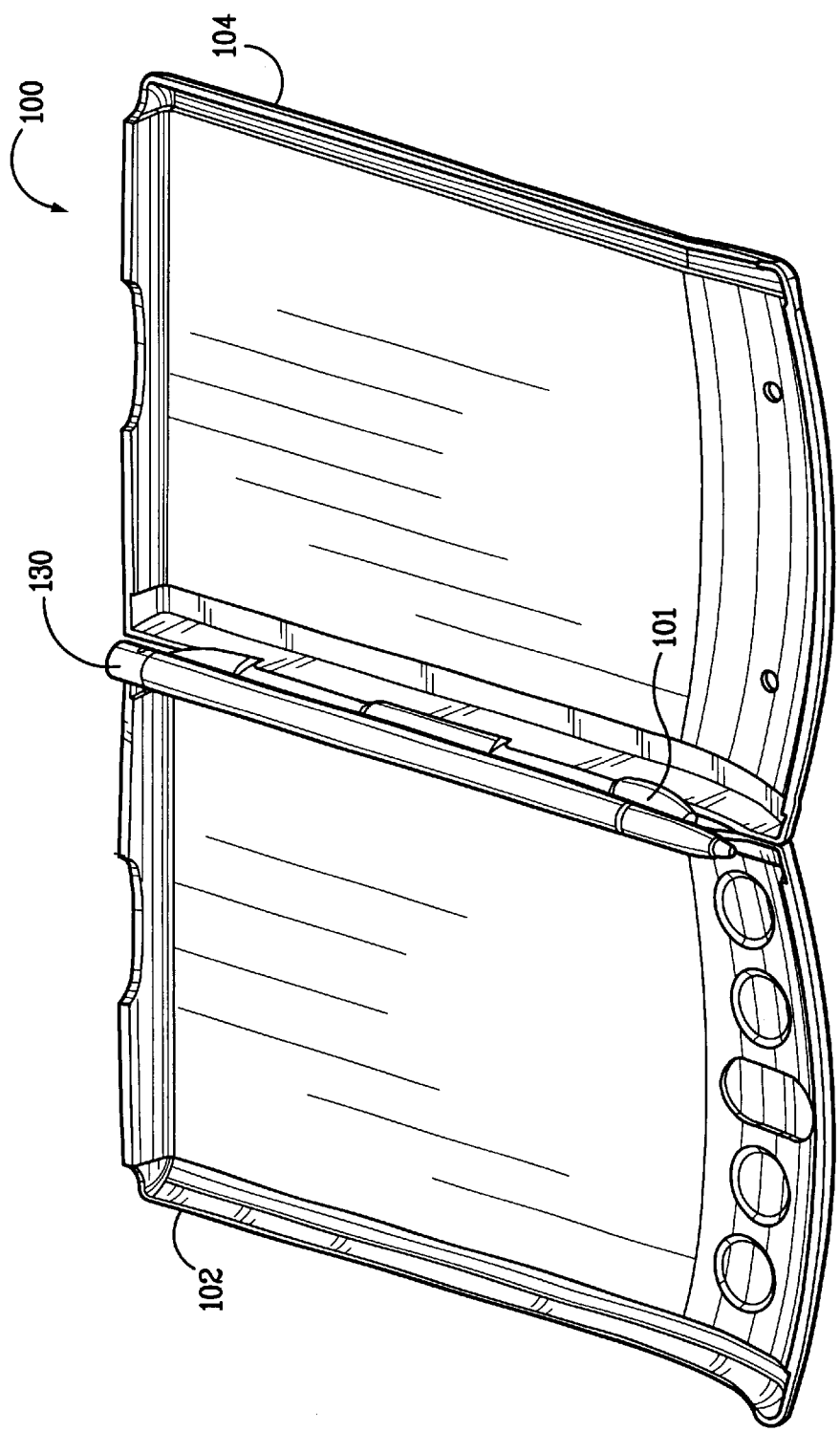
FIG. 10 is a perspective view of the detachable case showing the detachable case in the fully opened position and showing the mounting rail in the 90 degree position.

FIG. 10 is similar to FIG. 9. However, in this figure, mounting rail 130 is shown pivoted about the axis of the hinge assembly 101, and equidistant between the top cover assembly 102 and bottom cover assembly 104 (i.e. at 90 degrees).

Figure 11:
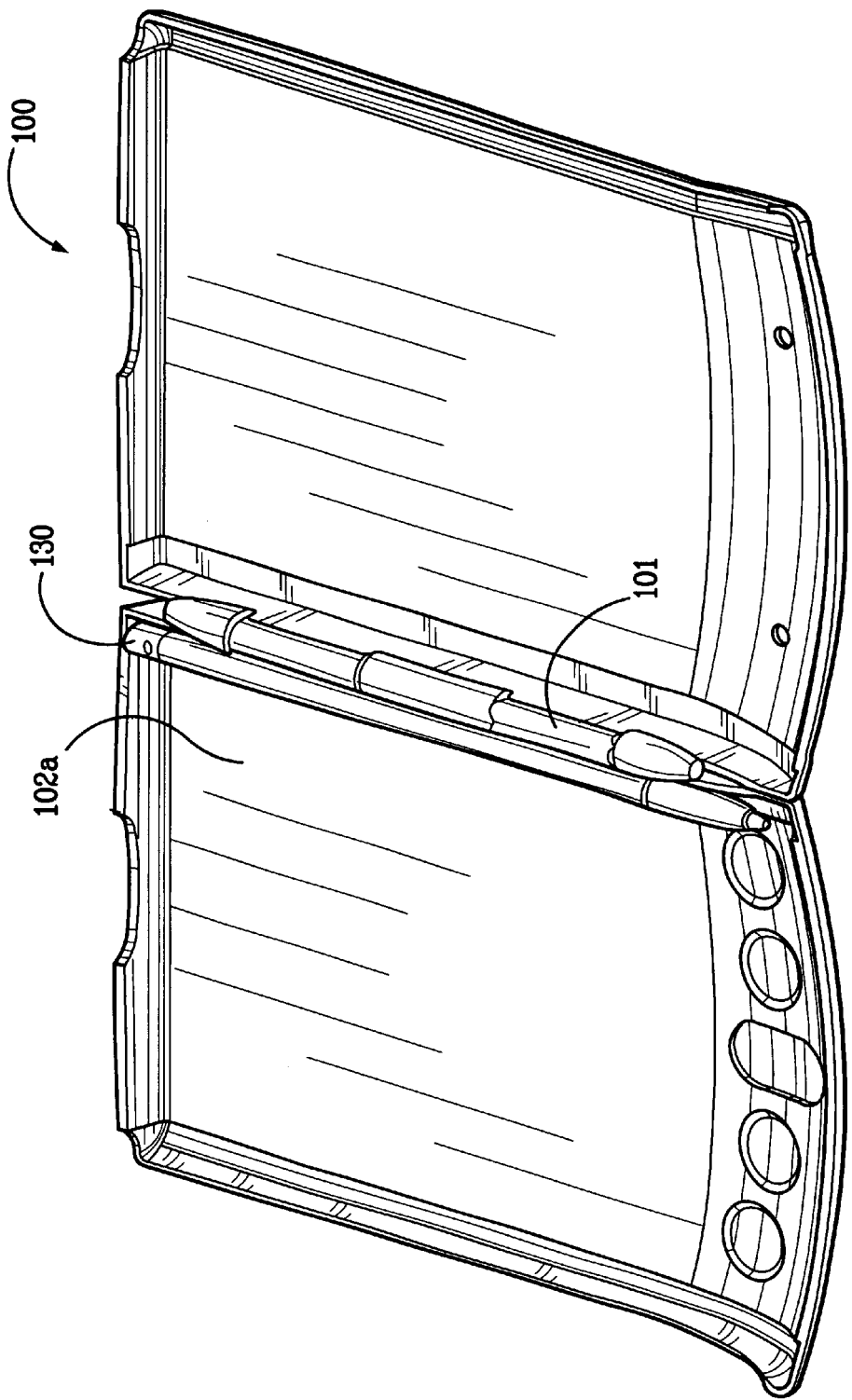
FIG. 11 is a perspective view of the detachable case of FIG. 1, showing the detachable case in the fully opened position and showing the mounting rail in the fully opened position at 180 degrees.

FIG. 11 is similar to FIG. 9, as well. However, in this figure, mounting rail 130 is shown pivoted about the axis of the hinge assembly 101, but now resting completely against the inner upper cover 102a (i.e. at 180 degrees).

Figure 12:
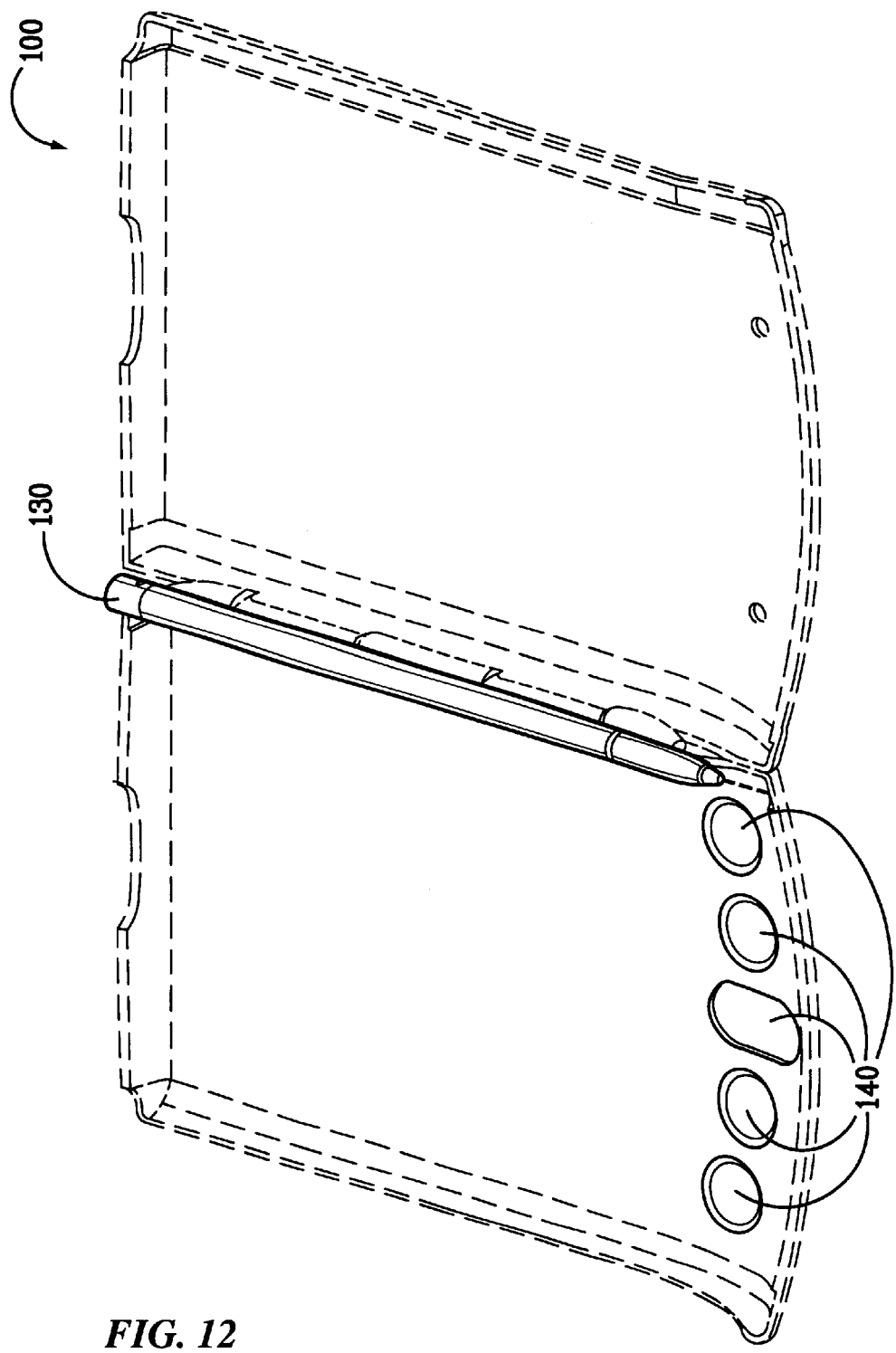
FIG. 12 is a perspective view of the detachable case similar to FIG. 11 but partly in phantom showing the mounting rail in the fully opened position.

FIG. 12 shows a perspective view of the detachable case 100 showing the mounting rail 130 in the fully opened position. The indents 140 are shown to comprise four circular and one stretched circular shape. These indents 140 are manufactured with a cutout or indent configuration to accommodate the button or touch point configuration of the particular commercial PIM it is desired to mount within the case 100.

Referring now to FIG. 14, the electronic device 124 is mounted in the case 100 by slipping its stylus opening 202 over the mounting rail 130. If the electronic device 124 has stylus openings 200 and 202 running longitudinally along each of the side edges of the unit, then the electronic device can be mounted within the case 100 either facing to the right or facing to the left. This, of course, depends on the desires of the user, and what may be comfortable to a left-handed person may also be comfortable to a right-handed person. So no predetermined choice is inferred for either right- or left-handers. It is to be understood, however, that while the preferred embodiment allow for alternate internal placement facing left or right, it is still within the principles of the present invention for the PIM or PDA device to only be mountable within the case 100 facing in a predetermined direction.

Figure 13:
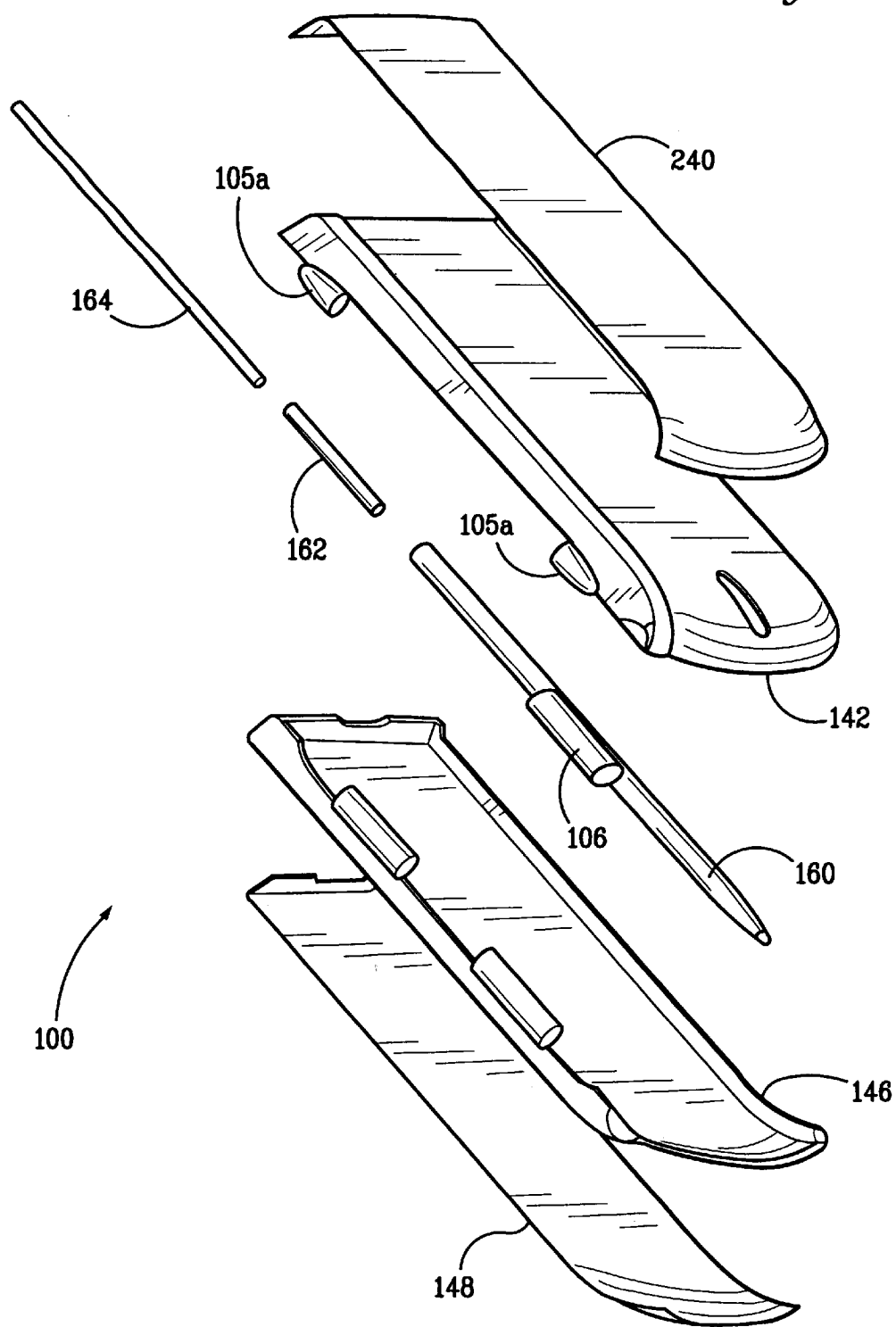
FIG. 13 is a breakaway view of the detachable case showing all the major parts prior to assembly.

FIG. 13 is an assembly drawing for the detachable case 100. Top skin 240 would be mounted onto an inner top case 142 in the manner set forth above, such as adhesive or small insert tabs to form the top cover assembly 102. Bottom skin 148 would be similarly mounted to an inner bottom case 146 to form the bottom cover assembly 104. Depending on whether the PIM faces left or right, top inner cover 102a (not shown) would be mounted to either the top or bottom cover assemblies 102 and 104. Hinge rail 160 is similar to mounting rail 130 as seen in earlier figures. Spring 162 and hinge pin 164 complete the assembly. For purposes of completeness, the compositions of the components of the assembly follow, but one skilled in the art could substitute other similar compositions. For example, the top skin 240 and bottom skin 148 covers could be made of aluminum for lightness. Inner top case 142 and inner bottom case 146 could be made from ABS (acrylonitrile-butadiene-styrene). Similarly, the hinge rail 160 could be made from ABS as well. The spring 162 would normally be made from steel, and the hinge pin 164 could be made from stainless steel. The spring 162 would be used to bias the covers together to keep the case 100 from opening accidentally, to keep the covers from loosely flopping open and shut, or both.

In assembling the detachable case 100, the inner top cover 142 would be mounted to the top skin 240 by the methods set forth above. The inner bottom cover 146 would be mounted to the bottom skin 148 by the methods set forth earlier. The spring 162 would be inserted into one of the bottom hinge sections 105. Then the hinge rail 160 would be inserted into the bottom cover assembly 102. After the hinge sections 105, 105a, and 106 are aligned, the hinge pin 164 would be inserted through all the hinge sections 105, 105a and 106 and the spring 162 to complete the assembly of the detachable case 100.

Throughout this application, references to PIM units were made. One such PIM or electronic organizer is the PALM® III manufactured and sold by the Palm Computing Company, a 3COM Company, 1565 Charleston Road, Mountain View, Calif. 94043, U.S.A. While each detachable case 100 would probably be custom made for each particular PIM or electronic organizer, no limitation of the invention should be inferred in the event one detachable case 100 would fit another PIM or electronic organizer.

While the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

What is claimed is:

1. A protective cover for use with a personal electronic instrument comprising:

a top cover assembly, a bottom cover assembly, a hinge assembly operatively coupled to and a part of said top cover assembly and said bottom assembly to allow said top cover assembly and said bottom cover assembly to pivot about each other along an edge axis, and a mounting rail including a hinge section operatively coupled to said hinge assembly for mounting said electronic instrument, wherein the top and bottom cover assemblies are adapted for surrounding said electronic instrument when said top and bottom cover assemblies are in a closed configuration.

2. The hard case assembly as set forth in claim 1, wherein said mounting rail is shorter than the hinge assembly, and operable within an area as defined by said top cover assembly and said bottom cover assembly when in a closed configuration.

3. The hard case assembly as set forth in claim 1, wherein said mounting rail is an elongated generally cylindrical body situated a predetermined distance from said hinge axis, said mounting rail being pivotably about said hinge axis and limited only by an area defined by said top and bottom cover assemblies.

4. The hard case assembly as set forth in claim 1, wherein said top cover assembly further comprises a top inner case having indents and other openings to accommodate a specific electronic instrument when an operative surface of said electronic instrument is mounted in said hard case assembly facing said top inner case.

5. The hard case assembly as set forth in claim 1, wherein said bottom cover assembly further comprises a bottom inner case having indents to accommodate a specific electronic instrument when an operative surface of said electronic instrument is mounted in said hard case assembly facing said bottom inner case.

6. The hard case assembly as set forth in claim 1, said mounting rail being configured to allow said electronic instrument to be removably mounted to said mounting rail.

7. The hard case assembly as set forth in claim 6, said mounting rail being configured to allow said electronic instrument to be selectively removed from and reattached to said mounting rail with an operative surface facing either cover assembly.

8. The hard case assembly as set forth in claim 1, wherein said hinge assembly further comprises a hinge pin, the hinge pin being inserted into hinge sections of the top cover assembly, bottom cover assembly, and the mounting rail to operatively allow the top cover assembly, bottom cover assembly, and mounting rail to pivot about an axis defined by the hinge pin.

9. The hard case assembly as set forth in claim 8, further comprising a spring, the spring being inserted into the hinge assembly prior to the hinge pin with which to bias the top and bottom cover assemblies toward each other to form a closed hard case assembly.

10. The hard case assembly as set forth in claim 1, further comprising cutouts in said top and bottom cover assemblies to allow external data or other electronic communication to said electronic instrument while the case assembly is in a closed configuration.

11. The hard case assembly of claim 1, wherein said hinge assembly further comprises a plurality of detent grooves and corresponding detent bumps disposed about said hinge assembly to provide rest positions for said hinge assembly and said top cover assembly and said bottom assembly.

12. The hard case assembly of claim 1, wherein said mounting rail further comprises a plurality of detent grooves and corresponding detent bumps disposed about said mounting rail to provide rest positions for said mounting rail and said electronic instrument.

* * * * *

UNITED STATES PATENT AND TRADEMARK OFFICE
CERTIFICATE OF CORRECTION

PATENT NO.    : 6,239,968 B1
DATED         : May 29, 2001
INVENTOR(S)   : Kim et al.

It is certified that error appears in the above-identified patent and that said Letters Patent is hereby corrected as shown below:

Column 7,
Line 26, that portion of the claim reading "A protective cover" should read
-- A hard case assembly --.

Signed and Sealed this

Fourth Day of February, 2003

JAMES E. ROGAN
*Director of the United States Patent and Trademark Office*